(12) United States Patent
Hariharan et al.

(10) Patent No.: US 6,291,077 B1
(45) Date of Patent: Sep. 18, 2001

(54) LACTONE CHAIN-EXTENDED PHENOLIC POLYESTER POLYOLS

(75) Inventors: Rajan Hariharan, Duluth, GA (US); David A. Hutchings, Dublin, OH (US); Kenneth A. Bourlier, Plainsboro, NJ (US); Ellen V. Nagy, Covington, GA (US)

(73) Assignee: Georgia-Pacific Resins, Inc., Atlanta, GA (US)

( * ) Notice: Subject to any disclaimer, the term of this patent is extended or adjusted under 35 U.S.C. 154(b) by 0 days.

(21) Appl. No.: 09/649,002

(22) Filed: Aug. 28, 2000

Related U.S. Application Data

(62) Division of application No. 09/337,496, filed on Jun. 22, 1999, now Pat. No. 6,166,151.

(51) Int. Cl.[7] .......................... B32B 27/06; C08F 283/02
(52) U.S. Cl. .............................. 428/480; 528/87; 528/92; 528/101; 528/103; 528/104; 528/106; 528/107; 528/205; 528/246; 528/354; 528/355; 525/107; 525/132; 525/146; 525/390; 525/398; 525/461; 525/463; 525/465; 525/480; 525/481; 525/529; 525/534
(58) Field of Search .............................. 528/87, 92, 101, 528/103, 104, 106, 107, 205, 246, 354, 355; 525/107, 132, 146, 390, 398, 461, 463, 465, 480, 481, 529, 534; 428/480

(56) References Cited

U.S. PATENT DOCUMENTS

| | | |
|---|---|---|
| 4,464,526 | 8/1984 | Mueller . |
| 4,745,171 | 5/1988 | Sato et al. . |
| 4,791,189 | 12/1988 | Yu . |
| 5,264,547 | 11/1993 | Yamaguchi et al. . |
| 5,321,095 | 6/1994 | Greenwald . |
| 5,525,702 | 6/1996 | Nace . |
| 5,674,970 | 10/1997 | Hutchings et al. . |
| 5,756,652 | 5/1998 | Storey et al. . |
| 5,770,750 | 6/1998 | Hutchings et al. . |

*Primary Examiner*—Samuel A. Acquah
(74) *Attorney, Agent, or Firm*—Banner & Witcoff, Ltd.

(57) ABSTRACT

A lactone chain-extended polyester polyol of the present invention comprises the reaction product of a lactone and a previously chain-extended phenolic-based hydroxyl compound. The previously chain-extended phenolic-based hydroxyl compound may comprise the reaction product of (i) a lactone or an alkoxylating agent selected from the group consisting of alkylene oxides and alkylene carbonates, and (ii) a phenolic aralkylation polymer comprising the reaction product of a phenolic monomer having at least two free reactive positions; a styrene derivative; and a coupling agent. The previously chain-extended phenolic-based hydroxyl compound also may be chain-extended by reacting with a lactam to produce a lactam chain-extended polyester polyamide. The polyols and polyamides of the present invention provide unique combinations of hard and soft functionalities, which translates into materials exhibiting a unique combination of toughness and hardness. These materials are especially suitable for use in high solids coatings and in the development of resins which can be readily processed into thermoset resins. The materials also may function as compatibilizers for thermoplastics.

16 Claims, No Drawings

US 6,291,077 B1

LACTONE CHAIN-EXTENDED PHENOLIC POLYESTER POLYOLS

This application is a divisional of application Ser. No. 09/337,496, filed Jun. 22, 1999, U.S. Pat. No. 6,166,151.

FIELD OF THE INVENTION

The present invention is directed to lactone chain-extended phenolic polyester polyols, lactam chain-extended phenolic polyester polyamides, and methods of making the same.

BACKGROUND OF THE INVENTION

Alkyd resins are commonly used in coating systems. Alkyd resins may be formed through the incorporation of unsaturated fatty acid esters into polyester or polyurethane chain-extended polymer systems. The simplest alkyd polyesters are those based on reaction products of tri-glycerides of unsaturated fatty acids.

In early resins of this type used in coating applications, speed of cure (drying speed) was increased through thermal advancement ("cooking") of the resin and viscosity was reduced by incorporation of a solvent prior to use. Such resins comprise fatty acid tri-glycerides which have undergone some degree of coupling of their linkages to generate higher molecular weight, cross-linked systems. Generally speaking, this cross-linking is accomplished thermally at high temperatures through free radical addition reactions or oxidatively. The latter process is promoted by incorporation of transition metal complexes capable of catalyzing the auto-oxidation of the allylic hydrogens associated with the unsaturated fatty acids to generate hydroperoxides and peroxides which are capable of facilitating cross-link formation between fatty acid double bonds by initiating free radical addition processes.

Later versions of alkyds are based on transesterified tri-glycerides. In these systems, a tri-glyceride is reacted with excess glycerol to generate a mixture of mono-, di-, and tri-glycerides, with the mono-glyceride component present in the largest amount. The resulting pre-polymer then is reacted with di-acids or anhydrides, such as adipic acid, phthalic anhydride, or isophthalic acid, to produce chain-extended polyesters containing fatty acid ester side chains. Such polyesters are capable of undergoing relatively rapid cure in the presence of the aforementioned auto-oxidation catalyst systems.

Alkyd resins also may be modified through the incorporation of other polyols, i.e., diols, triols, tetraols, or higher order alcohols. In addition, transesterification may be carried out with polyols other than glycerol. One polyol of particular interest is pentaerythritol, which is a primary tetraol. This material can be esterified with fatty acids through transesterification with naturally occurring triglycerides of unsaturated fatty acids, such as those found in commercial tall oil fatty acid streams. In the latter case, pentaerythritol can be reacted with 1, 2, or 3 fatty acid moieties and incorporated into an alkyd coating system.

Another commonly used component of coating systems are uralkyds, which are analogous to the polyester alkyds. Uralkyds can be derived by substituting a di- or polyisocyanate for a portion of the di-acid component used in alkyd preparation to achieve chain extension or grafting. Uralkyds are produced from base alkyds having excess hydroxy functionality. These polyols can be reacted at modest temperatures under catalysis with di- or polyisocyanates to produce urethane-linked coating systems having improved mechanical, environmental, and hydrolytic performance.

Phenolic polyols are yet another useful component of coating systems. Phenolics can be "cooked" with other components, such as drying oils, or can be cold-blended with other components to produce coating systems. Phenolics are used to impart desirable characteristics, such as adhesion and corrosion resistance, to coating systems. However, phenolics are not without drawbacks. For example, phenolics typically have a high viscosity that must be reduced by using an organic solvent, thereby limiting their use in low VOC systems. Phenolics also tend to darken with age, thus changing the color of the coating. Indeed, such a color change might "bleed through" subsequently-applied coating layers, thus reducing the suitability of a primer coat comprising a phenolic moiety.

Conventional phenolics are the product of polymerization of a phenol with a formaldehyde. Two such commonly-used phenolics are p-phenylphenol/formaldehyde polymer and p-t-butylphenol/formaldehyde polymer. The former is expensive and now seldom used. The methylene linkages in the latter subject the phenolic polymer to increased risk of formation of quinone methides. Because it is the formation of quinone methides that causes the polymer to darken, p-t-butylphenou/formaldehyde polymer tends to darken and therefore is not completely satisfactory in many uses.

Improvements in color and corrosion resistance can be made by substituting some bisplienol-A for p-t-butylphenol. It is generally accepted that the isopropylidene linkage in the bisphenol-A molecule decreases the tendency for quinone methide formation in phenolic polymers. Unfortunately bisphenol-A, because of the two hydroxyl groups, has very poor solubility with oils and the common solvents used in coating formulations. Therefore, only modest modifications with bisphenol-A can be used for these polymers.

Another class of phenolic polyols has recently been developed which also is useful in coating systems. Phenolic aralkylation polyol polymers of this class exhibit improved oil solubility, an improved compatibility with oil and alkyd-based polymers, as well as with urethanes, epoxies, and acrylates and a decreased tendency for color body formation and resultant darkening of coatings in which they are incorporated. The polymers can be made substantially free of residual formaldehyde and phenol.

A lower melting-polyol of this class is the phenolic aralkylation polymer reaction product obtained by aralkylating a phenolic monomer with at least one styrene derivative to obtain an aralkylated phenol, then reacting the aralkylated phenol with a coupling agent to obtain the phenol aralkylation polymer, as described in U.S. Pat. No. 5,739,259 to Hutchings et al., incorporated by reference herein. Suitable coupling agents include aryl diolefins, formaldehyde, dialdehydes, and dibenzylic diols. The aralkylated phenol is joined to the coupling agent.

A higher melting point polyol of this class is a phenolic aralkylation polymer formed by reacting a phenolic monomer with an aryl diolefin to obtain a phenol/aryl diolefin polymer. The phenol/aryl diolefin polymer then is aralkylated with at least one styrene derivative to obtain phenol aralkylation polymer.

The highly aromatic character of this class of polymers broadens the range of compatibility with other components of coating systems. Polymers of this class also exhibit enhanced physical properties, adhesion, and barrier properties. However, there exists a continuing need for improved high performance coating systems and components thereof.

SUMMARY OF THE INVENTION

It is an object of the present invention to produce high performance coating systems, especially low viscosity phenolic systems which exhibit low solution viscosities.

According to the present invention, lactone chain-extended polyester polyols ("star polymers") are produced from phenolic based hydroxyl compounds and exhibit a unique and improved combination of hard and soft functionalities, which translates into materials exhibiting a unique and improved combination of toughness and hardness. These materials are especially suitable for use in high solids coatings and in the development of resins which can be readily processed into thermoset resins. These materials also may function as compatibilizers for thennoplastics. The star polymer structure allows the materials to compatibilize different types of thermoplastics to generate new material classes. This ability to compatibilize different types of thermoplastics also is critical in imaging systems where performance decreases when polymer components phase-separate on cooling with a resultant loss of gloss. The polyols of the present invention optionally may be further acrylated or esterified to produce materials having desired properties and myriad end uses.

According to one aspect of the present invention, a lactone chain-extended polyester polyol comprises the reaction product of a lactone, preferably ε-caprolactone, and a previously chain-extended phenolic-based hydroxyl compound. The phenolic-based hydroxyl compound can be chain extended by reacting its phenolic hydroxyls with a lactone, an alkylene oxide, or an alkylene carbonate. Chain-extended phenolic-based hydroxyl compounds which may be used in accordance with the present invention particularly include those alkoxylated or lactonated phenolic-based hydroxyl compounds described in U.S. Pat. No. 5,770,750 to Hutchings et al., the disclosure of which is incorporated by reference herein. Preferred alkoxy-chain extended phenolic-based hydroxyl compounds can be prepared by the alkoxylation reaction between (i) an alkoxylating agent selected from the group consisting of alkylene oxides and alkylene carbonates, and (ii) a phenolic aralkylation polymer. Preferred lactone-chain extended phenolic-based hydroxyl compounds can be prepared by the reaction between a lactone and a phenolic aralkylation polymer. Phenolic aralkylation polymers can be prepared by the reaction between a phenolic monomer having at least two free reactive positions; a styrene derivative; and a coupling agent, as described in U.S. Pat. Nos. 5,837,798, 5,739,259, and 5,674,970, the disclosures of which are incorporated by reference herein.

According to another aspect of the present invention, a lactam chain-extended polyester polyamide comprises the reaction product of a lactam and a previously chain-extended phenolic-based hydroxyl compound.

According to a further aspect of the present invention, coating systems may be prepared which comprise the urethane reaction product of the lactone chain-extended polyester polyols of the present invention and an isocyanate selected from the group consisting of isocyanate, diisocyanate, polyisocyanate, and blends thereof. The urethane reaction product optionally is further reacted with an acrylate selected form the group consisting of hydroxy ethyl acrylate, hydroxy ethyl (meth)acrylate, and blends thereof, to form a coating system comprising an isocyanate acrylic reaction product.

According to yet another aspect of the present invention, a coating system is prepared which comprises the urea reaction product of the lactam chain-extended polyester polyamide of the present invention and an isocyanate selected from the group consisting of isocyanate, diisocyanate, polyisocyanate, and blends thereof. The urea reaction product optionally is further reacted with an acrylate selected form the group consisting of hydroxy ethyl acrylate, hydroxy ethyl (meth)acrylate, and blends thereof, to form a coating system comprising an isocyanate acrylic reaction product.

According to another aspect of the present invention, a process of compatibilizing thermoplastic materials comprises mixing a solution of polyamides and polyesters with a lactone chain-extended polyester polyol or a lactam chain-extended polyester polyamide.

DETAILED DESCRIPTION OF THE INVENTION

The lactone chain-extended phenolic polyester polyols of the present invention provide a unique combination of hard and soft functionalities, thereby enabling materials to be produced using the polyols which have a unique combination of toughness and hardness. Lactam chain-extended phenolic polyester polyamides exhibiting similar improved properties also may be produced. The materials of the present invention are especially suitable for use in high solids coatings and in the development of resins which can be processed readily into thermoset resins. The lactone chain-extended phenolic polyester polyols or lactam chain-extended phenolic polyester polyamides may be further acrylated or esterified according to well-known methods to produce useful, novel coating additives.

The term "alkyl" or "alk" as used herein denotes straight and branched chain saturated hydrocarbon groups, preferably having 1 to 20 carbon atoms, more usually 1 to 6 carbon atoms. Exemplary groups include methyl, ethyl, propyl, isopropyl, n-butyl, t-butyl, isobutyl, pentyl, hexyl, isohexyl, heptyl, 4,4-dimethylpentyl, octyl, 2,2,4-trimethylpentyl, nonyl, decyl, undecyl, dodecyl, and the like.

The term "alkoxy" as used herein denotes an alkyl group as described above bonded to a core structure through an oxygen linkage (—O—).

The term "cycloalkyl" as used herein alone or as part of another group, denotes saturated cyclic hydrocarbon ring systems, preferably containing 1 to 3 rings and 3 to 7 carbons per ring. Exemplary groups include cyclopropyl, cyclobutyl, cyclopentyl, cyclohexyl, cycloheptyl, cyclooctyl, cyclodecyl, cyclododecyl, and adamantyl.

The term "alkylene" as used herein denotes divalent saturated hydrocarbon groups of the formula —$C_nH_{2n}$—, wherein n preferably is from 1 to 10. Exemplary groups include methylene, ethylene, and propylene. Such groups represent alkyl groups from which another hydrogen has been removed.

The terms "ar" or "aryl" as used herein alone or as part of another group, denote homocyclic aromatic groups, preferably containing 1 or 2 rings and 6 to 12 ring carbon atoms. Exemplary groups include phenyl, biphenyl, and naphthyl.

The term "aralkyl" as used herein denotes homocyclic aromatic groups, preferably containing 1 or 2 rings and 6 to 12 ring carbons, bonded to a core structure through an alkyl (—$CH_2$—)$_n$ linkage, where n preferably is 1 to 4. Exemplary groups include benzyl.

The term "phenolic-based hydroxyl compound" as used herein denotes a compound based on phenols, ie., a compound having at least two phenol monomers and preferably contains repeating, substituted phenol monomers. Examples include compounds made by reacting, a phenolic monomer, such as p-phenyl-phenol, p-t-butyl phenol, and bisphenol-A with formaldehyde. Processes for preparing such phenol-formaldehyde polymers are well known. Suitable phenolic-based hydroxyl compounds also would include bisphenol-A itself. A preferred class of phenolic-based hydroxyl compounds are made by utilizing a phenolic monomer which is aralkylated with a styrene derivative to obtain an aralkylated phenol. The resultant aralkylated phenol then may be reacted with a coupling agent such as formaldehyde, a dialdehyde, a dibenzylic diol, or more preferably an aryl diolefin to obtain a phenolic aralkylation polymer. Alternately, the phenolic monomer may first be reacted with the coupling agent, preferably an aryl diolefin, e.g., divinyl benzene, to obtain a phenolic polymer, and preferably a phenol/aryl diolefin polymer. The phenolic polymer, and particularly the phenol/aryl diolefin polymer, thereafter is reacted with at least one styrene derivative to obtain a phenol aralkylation polymer. Such compounds and methods for their preparation are described in U.S. Pat. No. 5,837,798, 5,739,259, and 5,674,970, the full disclosures of which are incorporated by reference herein.

The term "chain-extended phenolic-based hydroxyl compound" or "previously chain-extended phenolic-based hydroxyl compound" as used herein denotes the reaction product of (i) a lactone, an alkylene oxide, or an alkylene carbonate and (ii) a phenolic-based hydroxyl compound as defined above. The reaction between the phenolic-based hydroxyl compound and the lactone, the alkylene oxide, or the alkylene carbonate, occurs at the phenolic hydroxyls and usually is conducted in the presence of a catalyst.

Alkoxy chain-extended phenolic-based hydroxyl compounds and methods for their preparation are described in U.S. Pat. No. 5,770,750 at column 16, line 60 to column 17, line 22. Lactone chain-extended phenolic-based hydroxyl compounds and methods for their preparation are described in U.S. Pat. No. 5,770,750 at column 20, lines 1–36, the disclosure of which is incorporated by reference herein.

Alkylene oxides contain an epoxide group. Suitable alkylene oxides are epoxides in which one or both of the epoxide carbons is substituted with hydrogen or a $C_1$ to $C_{10}$ alkyl, an aryl, or an aralkyl group. Preferred alkylene oxides are $C_2$ to $C_4$ epoxides, including ethylene oxide, propylene oxide, isobutylene oxide, 1,2-butylene oxide, and 2,3-butylene oxide. Alkylene oxides that contain halogenated alkyl groups, such as epihalohydrins, also can be used. Ethylene oxide is particularly preferred.

Alkylene carbonates are cyclic carbonates that contain the linkage —O—CO$_2$— in at least a five-membered ring. Suitable alkylene carbonates are cyclic carbonates in which one or more of the aliphatic ring carbons is substituted with hydrogen or a $C_1$ to $C_{10}$ alkyl, an aryl, or an aralkyl group. Preferred alkylene carbonates are ethylene carbonate, propylene carbonate, and butylene carbonate. Ethylene carbonate is particularly preferred. As a result of the alkoxylation, the aliphatic hydroxyl moiety is formed by opening of the oxirane or carbonate ring of the alkoxylating agent by the phenolic hydroxyl moiety, with the concurrent elimination of a —CO$_2$ group when a carbonate ring is used.

Preferably, the phenolic-based hydroxyl compound is alkoxylated completely, or partially, using propylene or ethylene oxide or their respective carbonates. The degree of alkoxylation (or polyalkoxylation) can be varied from 1 to 10 in the case of alkylene oxide alkoxylation, with polyalkoxylenes being produced when a molar excess of the alkylene oxide is employed. The degree of alkoxylation (or polyalkoxylation) is defined as the number of moles of alkylene oxide reacted per number of moles of free hydroxyl. For example, the degree of alkoxylation is 1 when four moles of alkylene oxide are reacted with one mole of a phenolic-based hydroxyl compound having a functionality of 4, i.e., four free hydroxyls.

For applications where only mono-lactone substitution is desired in the lactone chain-extended polyester polyol, ethylene modifications (oxides or carbonates) are preferred alkoxylating reagents because the reactivity of the lactone is such that primary alkoxylates yield chain-extended polyester polyols to the minimization of poly-lactone branch formation. Lactone chain-extended secondary hydroxyls have a tendency to further react with free lactone, thus yielding poly-lactone branch formation. Ethylene carbonate has an especially high selectivity to primary hydroxyls.

Exemplary alkoxylated phenolic hydroxyl compounds include primary hydroxyls having an idealized structure selected from the group consisting of:

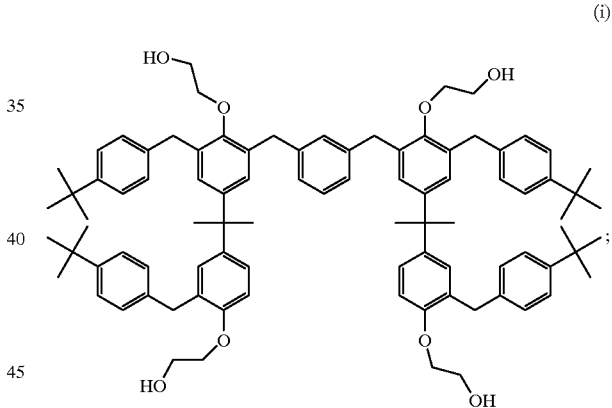

(i)

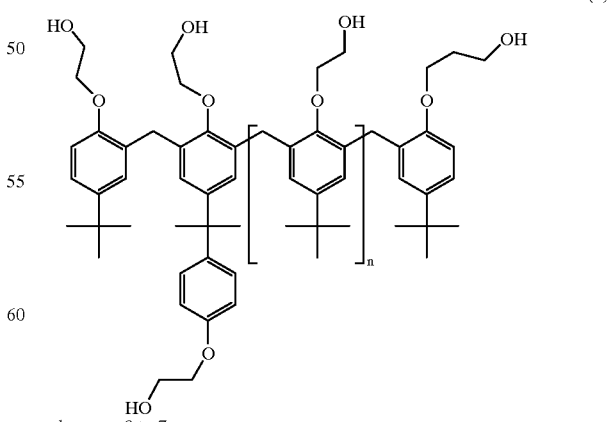

(ii)

where n = 0 to 7;

and

-continued

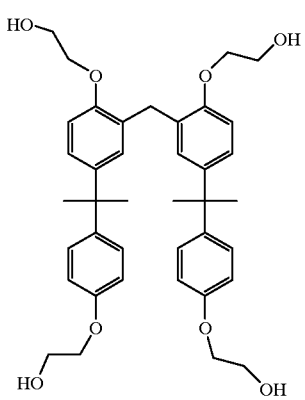

(iii)

The term "lactone chain-extended phenolic polyester polyol" as used herein denotes the reaction product of (i) a lactone and (ii) a chain-extended phenolic-based hydroxyl compound as defined above.

Any lactone or combination of lactones may be used in accordance with the present invention. Preferably, the lactone has at least four carbon atoms in the ring. One exemplary class of lactones which may be used has formula (I):

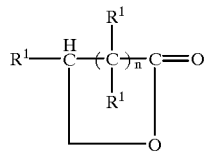

(I)

wherein n is an integer from 1 to about 7; and each $R^1$ independently is selected from hydrogen, $C_1$–$C_{20}$ alkyl, preferably $C_1$–$C_6$ lower alkyl, cycloalkyl, alkoxy, and phenyl, with the proviso that the number of $R^1$ groups which are H is at least (n+2).

Other lactones which may be used in the present invention include substituted and unsubstituted ε-caprolactone, γ-caprolactone, and butyrolactone. A preferred class of lactones is ε-caprolactones of formula (II):

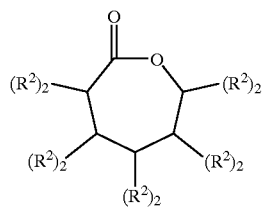

(II)

wherein each $R^2$ independently is hydrogen or a $C_1$–$C_4$ alkyl or alkoxy radical, with the proviso that no more than three $R^2$ substituents are groups other than hydrogen. Preferably, all $R^2$ substituents are hydrogen.

The term "lactam" as used herein denotes a lactone as defined above except that the heterocycle oxygen atom is replaced by a hydrogen substituted nitrogen atom. For purposes of illustration, the reaction mechanisms are described below for the lactone chain-extension reaction. It should be understood that lactams may be used instead of or in addition to lactones for the chain-extension reactions described herein. A lactam reacts with the previously chain-extended phenolic-based hydroxyl compound in a manner analogous to the lactone reaction. The lactam chain extension forms an amino (—$NH_2$) instead of a hydroxyl (—OH) as is formed by the lactone reaction.

In the broad practice of the present invention, the previously chain-extended phenolic-based hydroxyl compound will have either, or both, primary and secondary hydroxyl groups, depending on the entity used in the previous chain extension reaction.

Primary hydroxyls react with ring-openable lactones, e.g., ε-caprolactone, in the process of the present invention to form chain-extended polyester polyols according to the following reaction mechanism:

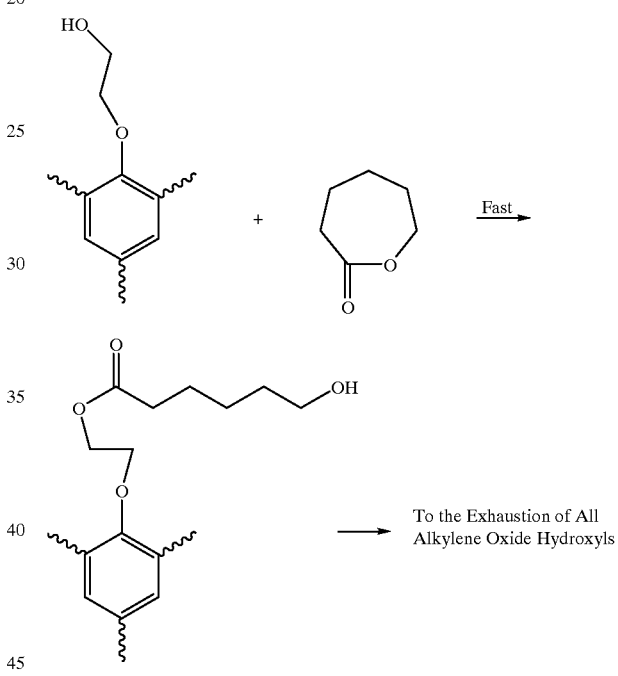

The reaction of a lactone with primary hydroxyls is believed to be favored by inductive effects. Mien secondary hydroxyls are used, higher lactone reactivity with the monolactone substituted polyols yields poly-lactone substitution according to the following reaction mechanism:

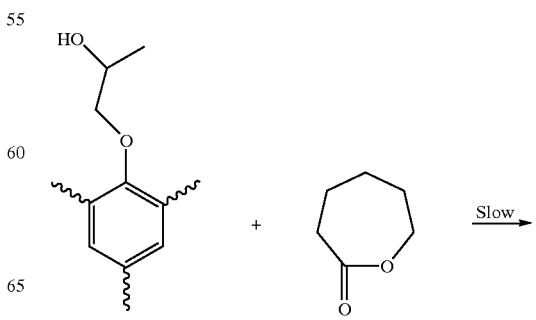

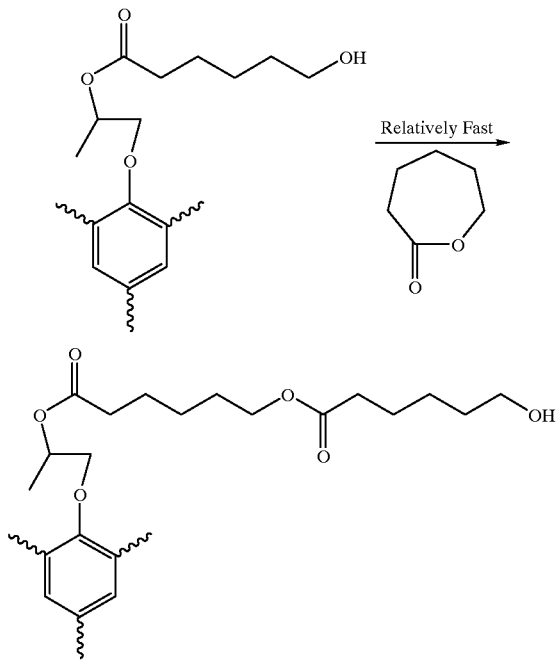

As a result, for applications where the minimization of poly-lactone substitution is desirable, it is preferred to prepare the polyols of the present invention from previously chain-extended phenolic-based hydroxyl compounds where most, and more preferably where all of the hydroxyl groups are primary hydroxyls. For applications where poly-lactone substitution of the previously chain-extended phenolic-based hydroxyl compounds is advantageous, secondary hydroxyls can be formed, e.g., by using propylene oxide or propylene carbonate to chain-extend the phenolic-based hydroxyl compound.

As will be understood by those skilled in the art, the reaction between the lactone and the previously chain-extended phenolic-based hydroxyl compound is conducted in an environment which facilitates ring-opening of the lactone, e.g., in the presence of a suitable catalyst. Suitable exemplary catalysts for the reactions include strong bases such as sodium hydroxide and Lewis acid catalysts. One preferred Lewis acid catalyst is dibutyltin dilaurate. Another preferred catalyst is tin octoate. Metal alkoxides such as aluminum alkoxides, titanium alkoxides, and lanthanide alkoxides may also be used as catalysts or catalyst components. The required concentration of the catalyst varies widely depending on the type of catalyst used and the particular reactants used, and may range from about 0.03 wt % to about 1 wt %, more typically from about 0.03 wt % to about 0.3 wt %, and even more typically from about 0.03 wt % to about 0.1 wt %, based on the total weight of the reaction charge.

As noted above, the previously chain extended phenolic-based hydroxyl compound may contain one or more primary hydroxyl(s) and/or one or more secondary hydroxyl(s). At least some of the hydroxyls of the chain extended phenolic-based hydroxyl compound are lactone-substituted in accordance with the process of this invention. Preferably, all the alkoxyl hydroxyls on the previously chain extended phenolic-based hydroxyl compound are lactone-substituted. According to one embodiment of the invention, all hydroxyls are primary hydroxyls and are lactone-substituted without further chain extension of the lactone substituent.

According to an alternate embodiment of the invention, the previously chain extended phenolic-based hydroxyl compound contains at least some secondary hydroxyls, for applications where lactone chain-extended polyester polyols having poly-lactone chain extensions are desired.

Alkoxylating agents optionally may be mixed to provide lactone chain-extended polyester polyols having both mono-lactone and poly-lactone branch formation. For example, propylene oxide and ethylene oxide may be combined at a 3:1 molar ratio and reacted with a phenolic-based hydroxyl compound to produce chain-extended phenolic-based hydroxyl compounds having primary and secondary hydroxyls at about a 1:3 ratio. When the compounds are subsequently reacted with a lactone, the resultant lactone chain-extended polyester polyols will have both mono-lactone and poly-lactone branch formation, e.g., at about a 1:3 ratio, according to the mechanisms described above.

Other combinations also are envisioned, such as first reacting a phenolic-based hydroxyl compound with propylene oxide, followed by reacting the secondary hydroxyl moiety of the resultant chain-extended compound with ethylene oxide. The resultant chain-extended phenolic-based hydroxyl compound then may be reacted with a lactone to produce a lactone chain-extended phenolic-based hydroxyl compound having unique properties, e.g., improved water resistance and low viscosity.

The reactants preferably are combined in a molar ratio of moles of reactive hydroxyls to moles of lactone from about 1:10 to about 10:1, more typically from about 1:2 to about 5:1, and even more typically from about 1:1 to about 1:3. A stoichiometric excess of lactone, e.g., a two-fold excess, ensures complete or substantially complete lactone substitution of the hydroxyls.

Other conditions for the reaction include a reaction temperature of from about 100° C. to about 250° C., more typically from about 130° C. to about 200° C., and even more typically from about 150° C. to about 190° C.; and a reaction time from about 5 minutes to about 24 hours, typically from about 15 minutes to about 4 hours, and even more typically from about 30 minutes to about 60 minutes. At temperatures above 250° C., residence times become unacceptably short. The color of the product was improved when lower reaction temperatures, e.g., near or below 150° C., were used.

The lactone chain-extended polyester polyols of the present invention have utility in the preparation of adhesives, paints, and various other types of coating systems. One such class of adhesives are cured with zinc complexes which require only the presence of phenolics with ortho methylols. For polyols used as additives in air-dry paints, p-t-butyl-styrene- or a combination of p-t-butyl-styrene- with α-methyl-styrene- or vinyl toluene-based hydroxyl compounds are preferred. The lactone chain-extended polyester polyols of the prevent invention also may be chemically incorporated into alkyd or uralkyd coating systems in accordance with well-known methods to produce useful and improved coating systems. For example, urethane systems may be prepared by reacting the lactone chain-extended polyester polyols with an isocyanate, such as isocyanate, diisocyanate, polyisocyanate, and blends thereof. The urethane thus-formed can be further reacted with an acrylate, such as hydroxyl ethyl acrylate or hydroxy ethyl (meth)acrylate, to produce an isocyanate acrylic system.

Similarly, lactam chain-extended polyester polyamides may be reacted with an isocyanate, such as isocyanate, diisocyanate, polyisocyanate, and blends thereof, to prepare urea systems. The urea can be further reacted with an acrylate, such as hydroxyl ethyl acrylate or hydroxy ethyl (meth)acrylate, to produce an isocyanate acrylic system.

The lactone chain-extended polyester polyols of the present invention also can be derivatized with other functionalities. Typically, such functionalities provide a particularly convenient manner of incorporating the lactone chain-extended polyester polyols into other polymer systems. For example, acrylate functionality may be introduced by reacting the lactone chain-extended polyester polyol with an acrylate in accordance with well-known methods. Suitable exemplary acrylation agents include acrylic acid, (meth) acrylic acid, and blends thereof.

The lactone chain-extended polyester polyols can be esterified or polyesterified by reacting with a fatty acid or mixture of fatty acids in accordance with well-known methods. The fatty acid(s) may be saturated ($C_nH_{2n+1}COOH$) or unsaturated ($C_nH_{2n-1}COOH$, $C_nH_{2n-3}COOH$, or $C_nH_{2n-5}COOH$). Any commercially available fatty acids may be used to esterify the hydroxyl moieties of the lactone chain-extended polyester polyol. To incorporate the esterified product into an alkyd coating by cross-linking, it is necessary for some of the esterified polymer molecules to be formed by reaction with unsaturated fatty acids. The unsaturation in the carbon chain provides cross-linking sites during formation of the coating. A saturated fatty acid or its ester may be acceptable if the fatty acid or its ester is to be reacted into a coating other than by this cross-linking reaction. One commercially available blend of fatty acids which may be used for esterification is tall oil fatty acid (TOFA).

The lactone chain-extended polyester polyols of the present invention can be used to compatibilize thermoplastic materials. For example, a solution of the lactone chain-extended polyester polyol can be mixed with a solution of thermoplastics, such as polyamides, e.g., nylon, and polyesters, e.g., DACRON, to compatibilize these materials. The thermoplastics thus-prepared have improved properties, including greater flexibility.

EXAMPLES

The following examples are illustrative of preferred aspects of the invention and are not intended to limit the scope of the invention. Examples 1 and 2 illustrate preparing lactone chain-extended phenolic polyester polyols in an electrically-heated, stirred, one-liter, glass reactor equipped with a nitrogen sparge and a thermo-watch temperature controller. A 95 wt % solution of dibutyltin dilaurate was employed as catalyst. The reactants included ε-caprolactone and an alkoxylated phenolic compound of idealized formula (III) (molecular weight=1358; functionality=7):

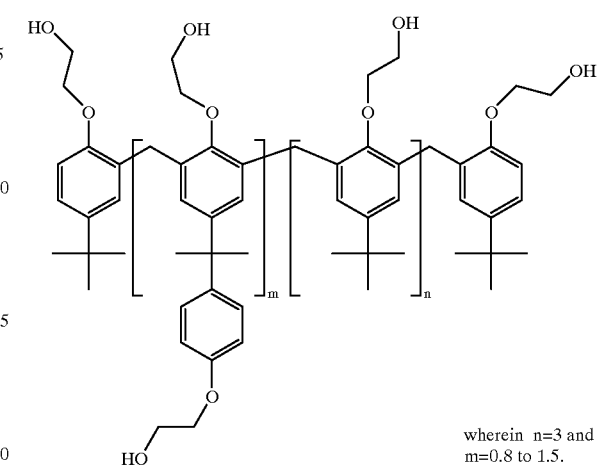

wherein n=3 and m=0.8 to 1.5.

Example 1

566 g of the formula (111) polyol were charged into the reactor and heated slowly under a stream of nitrogen to produce a low-viscosity melt capable of agitation. The reactor contents were heated to 180° C. and 333 g of ε-caprolactone, i.e., a slight molar excess, were added. The temperature was stabilized at 180° C. and 0.5 g of the dibutyltin dilaurate solution was added. The reactor was maintained at 180° C. for 30 minutes, after which time the reaction was stopped by cooling the reactor contents. During the course of the reaction, samples were withdrawn and heated on a 300° C. hotplate. The amount of free caprolactone was determined by measuring the weight loss of the sample.

The ultimate product thereafter was subjected to NMR analysis. NMR analysis showed that there was no free caprolactone in the product. The spectrum obtained was consistent with the complete reaction of the primary hydroxyls of the formula (III) polyol with the caprolactone.

Example 2

284 g of the formula (III) polyol were charged into the reactor and heated slowly under a stream of nitrogen to produce a low-viscosity melt capable of agitation. The reactor contents were heated to 180° C. and 333 g of ε-caprolactone, i.e., a two-fold molar excess, were added. The temperature was stabilized at 180° C. and 0.25 g of the dibutyltin dilaurate solution was added. The reactor was maintained at 180° C. for 30 minutes, after which time the reaction was stopped by cooling the reactor contents. During the course of the reaction, samples were withdrawn and heated on a 300° C. hotplate. The amount of free caprolactone was determined by measuring the weight loss of the sample.

The product obtained was a pourable liquid. Analysis by NMR showed that there was no free caprolactone in the product.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. An acrylate comprising the reaction product of an acrylate selected from the group consisting of acrylic acid, (meth)acrylic acid, and blends thereof, and a lactone chain-extended polyester polyol, wherein said lactone chain-extended polyester polyol comprises the reaction product of a first lactone and a previously chain-extended phenolic-based hydroxyl compound having at least one of primary hydroxyl groups and secondary hydroxyl groups.

2. An ester comprising the reaction product of a fatty acid and a hydroxyl moiety of a lactone chain-extended polyester polyol, wherein said lactone chain-extended polyester polyol comprises the reaction product of a first lactone and a previously chain-extended phenolic-based hydroxyl compound having at least one of primary hydroxyl groups and secondary hydroxyl groups.

3. A coating system comprising the urethane reaction product of (i) a lactone chain-extended polyester polyol, wherein said lactone chain-extended polyester polyol comprises the reaction product of a first lactone and a previously chain-extended phenolic-based hydroxyl compound having at least one of primary hydroxyl groups and secondary hydroxyl groups, and (ii) an isocyanate selected from the group consisting of isocyanate, diisocyanate, polyisocyanate, and blends thereof.

4. A coating system comprising the isocyanate acrylic reaction product of the urethane of claim 3 and an acrylate selected form the group consisting of hydroxy ethyl acrylate, hydroxy ethyl (meth)acrylate, and blends thereof.

5. A lactam chain-extended polyester polyamide comprising the reaction product of a lactam and a previously chain-extended phenolic-based hydroxyl compound having at least one of primary hydroxyl groups and secondary hydroxyl groups.

6. The lactam chain-extended polyester polyamide of claim 5 wherein said previously chain-extended phenolic-based hydroxyl compound comprises the alkoxylation reaction product of (i) an alkoxylating agent selected from the group consisting of alkylene oxides and alkylene carbonates, and (ii) a phenolic aralkylation polymer comprising the reaction product of a phenolic monomer having at least two free reactive positions; a styrene derivative; and a coupling agent.

7. The lactam chain-extended polyester polyamide of claim 6 wherein said alkoxylating agent is selected from the group consisting of propylene oxide, propylene carbonate, ethylene oxide, and ethylene carbonate.

8. The lactam chain-extended polyester polyamide of claim 7 wherein said lactam is selected from the group consisting of caprolactam and butyrolactam.

9. The lactam chain-extended polyester polyamide of claim 5 wherein said previously chain-extended phenolic-based hydroxyl compound comprises the reaction product of a second lactone and a phenolic-based hydroxyl compound.

10. The lactam chain-extended polyester polyamide of claim 9 wherein said second lactone is selected from the group consisting of caprolactone and butyrolactone.

11. A coating system comprising the urea reaction product of the lactam chain-extended polyester polyamide of claim 5 and an isocyanate selected from the group consisting of isocyanate, diisocyanate, polyisocyanate, and blends thereof.

12. A coating system comprising the isocyanate acrylic reaction product of the urea of claim 11 and an acrylate selected form the group consisting of hydroxy ethyl acrylate, hydroxy ethyl (meth)acrylate, and blends thereof.

13. A process of compatibilizing thermoplastic materials comprising mixing a solution of polyamides and polyesters with a lactone chain-extended polyester polyol, wherein said lactone chain-extended polyester polyol comprises the reaction product of a first lactone and a previously chain-extended phenolic-based hydroxyl compound having at least one of primary hydroxyl groups and secondary hydroxyl groups.

14. A product produced by the process of claim 13.

15. A process of compatibilizing thermoplastic materials comprising mixing a solution of polyamides and polyesters with the lactam chain-extended polyester polyamide of claim 5.

16. A product produced by the process of claim 15.

* * * * *

UNITED STATES PATENT AND TRADEMARK OFFICE
CERTIFICATE OF CORRECTION

PATENT NO. : 6,291,077 B1  Page 1 of 1
DATED : September 18, 2001
INVENTOR(S) : Rajan Hariharan et al.

It is certified that error appears in the above-identified patent and that said Letters Patent is hereby corrected as shown below:

Column 2,
Line 25, "bisplienol-A" has been replaced with -- bisphenol-A --.

Column 3,
Line 10, "thennoplastics" has been replaced with -- thermoplastics --.

Column 12,
Line 25, "111" has been replaced with -- III --.

Signed and Sealed this

Fifth Day of March, 2002

*Attest:*

JAMES E. ROGAN
*Attesting Officer*   *Director of the United States Patent and Trademark Office*